(12) United States Patent
Jung

(10) Patent No.: US 8,089,496 B2
(45) Date of Patent: Jan. 3, 2012

(54) METHOD FOR THREE-DIMENSIONAL DEPICTION OF A DIGITAL ROAD MAP

(75) Inventor: Thomas Jung, Bielefeld (DE)

(73) Assignee: Robert Bosch GmbH, Stuttgart (DE)

( * ) Notice: Subject to any disclaimer, the term of this patent is extended or adjusted under 35 U.S.C. 154(b) by 642 days.

(21) Appl. No.: 11/918,932

(22) PCT Filed: Apr. 5, 2006

(86) PCT No.: PCT/EP2006/061340
§ 371 (c)(1),
(2), (4) Date: Jan. 26, 2009

(87) PCT Pub. No.: WO2006/111470
PCT Pub. Date: Oct. 26, 2006

(65) Prior Publication Data
US 2009/0213111 A1  Aug. 27, 2009

(30) Foreign Application Priority Data
Apr. 19, 2005  (DE) .................. 10 2005 018 080

(51) Int. Cl.
*G09G 5/00*  (2006.01)
(52) U.S. Cl. .................. 345/672; 345/419; 345/473
(58) Field of Classification Search .................. 345/419, 345/473, 672; 701/200, 213
See application file for complete search history.

(56) References Cited

U.S. PATENT DOCUMENTS

| | | | |
|---|---|---|---|
| 6,683,609 B1 * | 1/2004 | Thompson et al. | 345/419 |
| 2001/0017623 A1 * | 8/2001 | Baron et al. | 345/419 |
| 2002/0041328 A1 * | 4/2002 | LeCompte et al. | 348/144 |
| 2003/0011750 A1 * | 1/2003 | Tzidon | 353/30 |
| 2003/0080958 A1 * | 5/2003 | Matsumoto et al. | 345/421 |
| 2005/0253840 A1 * | 11/2005 | Kwon | 345/419 |
| 2006/0190172 A1 * | 8/2006 | Cross et al. | 701/213 |
| 2008/0100625 A1 * | 5/2008 | Johnson et al. | 345/473 |

FOREIGN PATENT DOCUMENTS

| | | | |
|---|---|---|---|
| JP | 2001083872 | * | 3/2001 |
| JP | 2001083872 A | * | 3/2001 |
| JP | 2001336942 A | * | 12/2001 |
| JP | 2001336942 A | * | 12/2001 |
| JP | 2001 336942 | | 8/2002 |
| JP | 2009244068 | * | 10/2009 |
| JP | 2009244068 A | * | 10/2009 |

* cited by examiner

*Primary Examiner* — Chante Harrison
(74) *Attorney, Agent, or Firm* — Kenyon & Kenyon LLP

(57) ABSTRACT

In order to provide a method that uses the region of a visual depiction of a digital road map in the vicinity of and above the horizon to convey to the user an enhanced impression of depth, provision is made that a plurality of image objects are drawn in the region of the horizon and thereabove, the individual image objects shifting with respect to one another upon a change in the position or travel direction of the vehicle.

20 Claims, 3 Drawing Sheets

US 8,089,496 B2

METHOD FOR THREE-DIMENSIONAL DEPICTION OF A DIGITAL ROAD MAP

FIELD OF THE INVENTION

The present invention relates to a method for three-dimensional depiction of a digital road map, and to a navigation device.

BACKGROUND INFORMATION

Navigation devices in which a portion of a road map is reproduced on a screen as a function of the position of a vehicle and its direction of motion are known from the existing art. A number of types of depiction are usual, divided into various categories in terms of their underlying data structures and the calculation operations carried out by the system. The simplest model is a two-dimensional depiction of a vector map containing the navigation data (surfaces, lines, points, labels). On the other hand, a perspective depiction of the map data is often preferred in order to make available to the person operating the vehicle visual information about his or surroundings that is as easy as possible to interpret. The depiction can optionally contain elevation information about the terrain (which is not necessarily flat), or can be merely a three-dimensional depiction of a "flat" map. The latter model is referred to as a pseudo-3D depiction. In both cases, the data of a vector map on which the map is based must be converted, under the influence of a coordinate transformation, into the image data containing a perspective representation. A linear imaging procedure is usually used, in which only the end points of lines present in the map are projected and are reconnected with a line. The polygons that are to be filled are then assembled from these lines. A standard CPU (central processing unit) or a GPU (graphical processing unit) carries out the necessary 3D vector operations and polygon shading operations in hardware.

The perspective impression is achieved by selecting a virtual viewing position above the actual vehicle position. The higher the viewing position, the more information is made available to the user—information which in some cases he or she would not obtain from his or her position in the vehicle. For better orientation, the position of the vehicle is often also reproduced on the map.

Any projection method that generates a three-dimensional effect can in principle be used to calculate the image data. Particularly well known in this context is central projection, in which all the points to be imaged in the map are connected via connecting lines to the projection center, which coincides with the viewing position, via connecting lines whose intersection points with a projection plane yields the projected image. Because of the geometry of this kind of projection or a similar one, a horizon and an adjacent region that corresponds to the sky appear in the visual depiction. Static, decorative textures, in particular cloud images, are often provided in the depiction of the sky. As the vehicle moves and the visual depiction is correspondingly updated, such textures appear unrealistic because of their static nature, since they do not follow the motion of the vehicle.

SUMMARY OF THE INVENTION

It is an object of the present invention to utilize the region of the visual depiction in the vicinity of and above the horizon to convey to the user an enhanced impression of depth.

According to the present invention, this object is achieved by a method, and by a navigation device.

A realistic impression of depth can be generated by the fact that a plurality of image objects are drawn in the horizon region, and/or the region located thereabove, of the visual depiction of the digital road map, the individual image objects shifting with respect to one another upon a change in the position or travel direction of the vehicle. The image objects are typically cloud backdrops that are drawn one over another and correspond to different distances from the vehicle position.

In a preferred embodiment of the present invention, provision is made for individual image objects to shift with respect to one another in a direction parallel to the horizon upon a change in the travel direction of the vehicle. This creates the impression of a rotation of the viewing angle in the depiction. Cloud backdrops in the foreground are moved more quickly than cloud backdrops in the background.

In a preferred embodiment of the present invention, provision is made for the image objects to be drawn with the use of compositing. The method according to the present invention can thereby be easily implemented with the use of a well-known technology. In the most common version of compositing (alpha compositing) each pixel has assigned to it not only the RGB data but also an alpha value A called its "opacity." For an 8-bit depiction, this ranges from 255 for completely opaque to 0 for completely transparent. The layers of the visual depiction of the digital road map that are to be drawn are drawn one after another, there being a foreground and a background in each step. The layer that had been prepared in a previous step is to be regarded as a background. The result of the compositing then forms the background in a subsequent step, until the final image exists as the result of the last compositing step. If the background is completely transparent, what results as the outcome of the compositing is the foreground, and vice versa. If the foreground is opaque, the background is overwritten. In the method according to the present invention, the cloud backdrops are represented by different layers, the clouds being drawn as either opaque or almost opaque.

It is additionally preferred that static image elements be drawn, in transparent or partly transparent fashion, over the image objects. These image elements can be background information for the user that is intended always to appear at the same location in the visual depiction. Because of the partial or complete transparency, the relative shifting of the image objects drawn behind the image elements is still visible, thereby creating the impression of dynamism.

The object of the present invention is furthermore achieved by the navigation device according to the present invention, which is notable for the fact that the conversion unit encompasses means for drawing image objects that shift with respect to one another upon a change in the position or travel direction of the vehicle.

DETAILED DESCRIPTION

Figure 1:
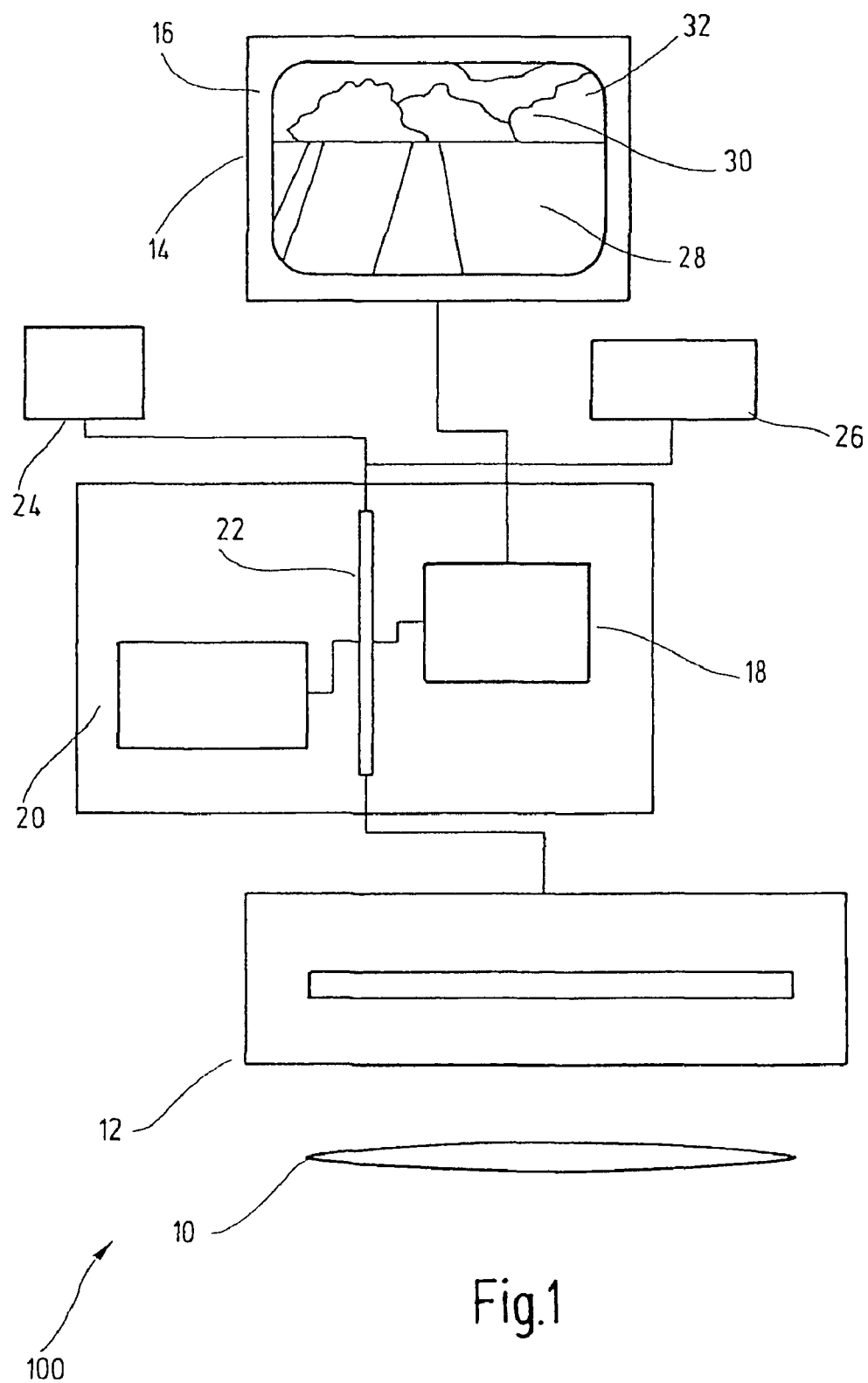
FIG. 1 shows a navigation device according to the present invention.

FIG. 1 shows a navigation device, labeled 100 in its entirety. The data of a digital road map are stored on a storage medium 10, for example on a CD-ROM or DVD that is present in a drive 12. Displayed on a display device 14 is a visual depiction of digital road map 16 that is generated by a microprocessor 18 that calculates the present position of the vehicle on the basis of measured data that are ascertained from a position sensor 24 such as, for example, a GPS sensor and a direction measuring device 26, and reads from memory medium 10 a portion of the road map that includes the vehicle's present position. Microprocessor 18, which is connected via a system bus 22 to a working memory 20, calculates at regular time intervals perspective images that are adapted to the present position and orientation of the vehicle, and supplies the vehicle operator with information as to his or her immediate surroundings and intended destination. The visual depiction of digital road map 16 reproduced on display device 14 encompasses a first region 28 containing the topographic information, and a second region 32, separated from the first region by a horizon 30, that corresponds to the sky. The image conversion unit constituted by microprocessor 18 and working memory 20 encompasses means for drawing image objects that shift with respect to one another upon a change in the position or travel direction of the vehicle.

Figure 2:
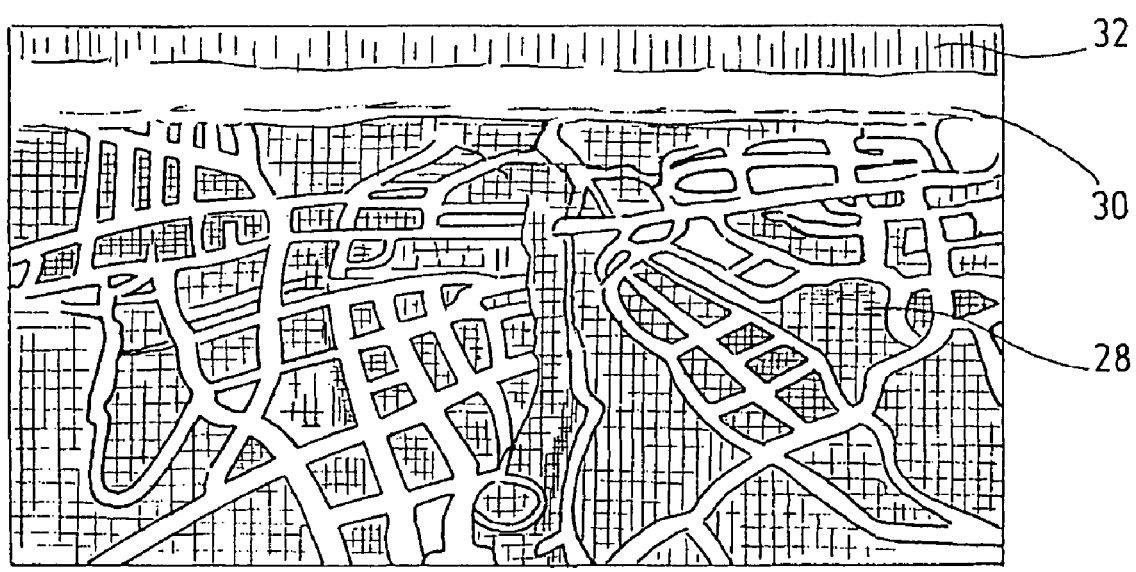
FIG. 2 shows a visual depiction of a digital road map.

FIG. 2 shows, in greater detail, the visual depiction of a road map 16.

Visual depiction 16 is limited to a field of view that is located in the travel direction on the basis of an elevated virtual viewpoint and delimited laterally by a specified acceptance angle of the depiction. First region 28 containing the topographical information depicts, in color, road segments calculated with the use of a coordinate transformation from the data of a digital road map stored on the storage medium, as well as fill areas bounding said segments. The images displayed in display device 14 are periodically recalculated and re-depicted. The method according to the present invention refers to each individual one of these images. Cloud backdrops 34 (not depicted in detail in FIG. 2) are drawn in sky 32 located above horizon 30 and are superimposed on one another with the use of alpha compositing. Cloud backdrops 34 are drawn as opaque or at least partly opaque.

Figure 3:
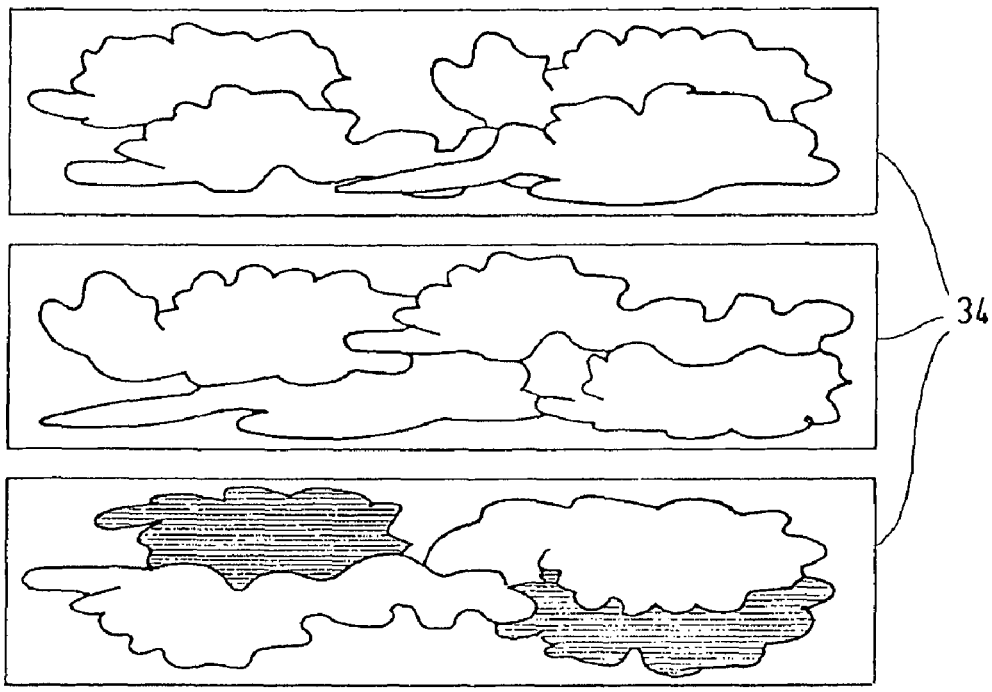
FIG. 3 schematically shows a variety of cloud backdrops.
Figure 4:
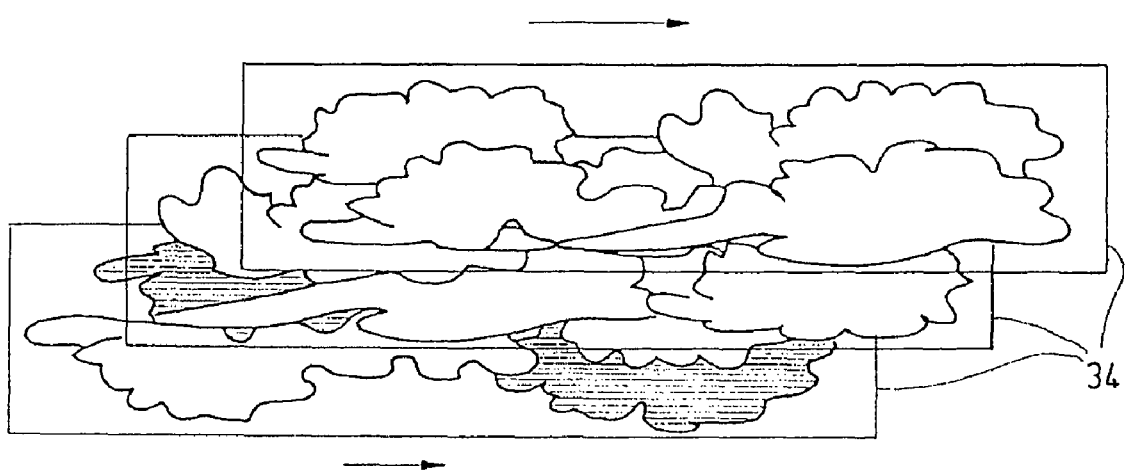
FIG. 4 schematically shows a superposition of the cloud backdrops.

FIG. 3 schematically shows a variety of cloud backdrops 34 and layers in which cloud backdrops 34 are drawn. The cloud images can additionally be provided with textures in order to produce a natural impression. Cloud backdrops 34 are then superimposed on one another, and result in a stratification that is depicted in FIG. 4. Upon a rotation of the vehicle position, the layers are shifted with respect to one another at different rates. Advantageously, the rearmost cloud layer, and/or a layer that contains depictions of heavenly bodies, is moved synchronously with horizon 30, since otherwise an unrealistic discontinuity in dynamics occurs between the two regions 28 and 32.

What is claimed is:

1. A method for a three-dimensional depiction of at least a portion of a digital road map in a navigation system, the method comprising:

selecting topographical information from data stored on a storage medium as a function of a position and a travel direction of a vehicle; and converting, with the use of a coordinate transformation, the topographical information into a visual depiction of the digital road map corresponding to a virtual, elevated viewpoint, so that the visual depiction of the digital road map includes a first region containing the topographical information, and a second region separated from the first region by a horizon, wherein a plurality of image objects representing objects having different distances from the viewpoint are drawn in the second region, the individual image objects shifting with respect to one another upon a change in at least one of the position and travel direction of the vehicle, and image objects in a foreground are moved more quickly than image objects in a background.

2. The method according to claim 1, wherein at least some of the image objects represent cloud backdrops.

3. The method according to claim 1, wherein upon a change in the position of the vehicle, individual image objects shift with respect to one another in a direction perpendicular to the horizon.

4. The method according to claim 1, wherein upon a change in the travel direction of the vehicle, individual image objects shift with respect to one another in a direction parallel to the horizon.

5. The method according to claim 1, wherein the image objects are drawn with the use of alpha compositing.

6. The method according to claim 1, wherein at least some of the image objects are drawn one over another in an opaque fashion.

7. The method according to claim 1, wherein static image elements are drawn in an at least partly transparent fashion over the image objects.

8. The method according to claim 1, wherein at least some of the image objects represent cloud backdrops, wherein upon a change in the position of the vehicle, individual image objects shift with respect to one another in a direction perpendicular to the horizon, and wherein upon a change in the travel direction of the vehicle, individual image objects shift with respect to one another in a direction parallel to the horizon.

9. The method according to claim 1, wherein the image objects are drawn with the use of alpha compositing, wherein at least some of the image objects are drawn one over another in an opaque fashion, and wherein static image elements are drawn in an at least partly transparent fashion over the image objects.

10. A navigation device comprising:

a display device;

a position determination unit;

a storage medium for storing two-dimensional topographical information having a network of road segments; and a conversion unit for converting the topographical information into a visual depiction of a digital road map corresponding to a virtual, elevated viewpoint, the conversion unit including a drawing arrangement for drawing image objects that shift with respect to one another upon a change in at least one of a position and a travel direction of a vehicle;

wherein a plurality of image objects representing objects having different distances from the viewpoint are drawn in the second region, the individual image objects shifting with respect to one another upon a change in at least one of the position and travel direction of the vehicle, and image objects in a foreground are moved more quickly than image objects in a background.

11. The device according to claim 10, wherein at least some of the image objects represent cloud backdrops.

12. The device according to claim 10, wherein upon a change in the position of the vehicle, individual image objects shift with respect to one another in a direction perpendicular to the horizon.

13. The device according to claim 10, wherein upon a change in the travel direction of the vehicle, individual image objects shift with respect to one another in a direction parallel to the horizon.

14. The device according to claim 10, wherein the image objects are drawn with the use of alpha compositing.

15. The device according to claim 10, wherein at least some of the image objects are drawn one over another in an opaque fashion.

16. The device according to claim 10, wherein static image elements are drawn in an at least partly transparent fashion over the image objects.

17. The device according to claim 10, wherein at least some of the image objects represent cloud backdrops, wherein upon a change in the position of the vehicle, individual image objects shift with respect to one another in a direction perpendicular to the horizon, and wherein upon a change in the travel direction of the vehicle, individual image objects shift with respect to one another in a direction parallel to the horizon.

18. The device according to claim 17, wherein the image objects are drawn with the use of alpha compositing, wherein at least some of the image objects are drawn one over another in an opaque fashion, and wherein static image elements are drawn in an at least partly transparent fashion over the image objects.

19. The device according to claim 10, wherein the image objects are drawn with the use of alpha compositing, wherein at least some of the image objects are drawn one over another in an opaque fashion, and wherein static image elements are drawn in an at least partly transparent fashion over the image objects.

20. The method according to claim 8, wherein the image objects are drawn with the use of alpha compositing, wherein at least some of the image objects are drawn one over another in an opaque fashion, and wherein static image elements are drawn in an at least partly transparent fashion over the image objects.

* * * * *